United States Patent Office 3,595,901
Patented July 27, 1971

3,595,901
SELECTIVE 1:1 ADDITION OF ETHYLENE AND ACRYLONITRILE IN PRESENCE OF PALLADIUM METAL SALTS
Claibourne D. Smith, Wilmington, Del., assignor to E. I. du Pont de Nemours and Company, Wilmington, Del.
No Drawing. Filed Feb. 19, 1969, Ser. No. 800,759
Int. Cl. C07c *121/30*
U.S. Cl. 260—465.9
4 Claims

ABSTRACT OF THE DISCLOSURE

Isomeric pentenenitriles are prepared by the selective 1:1 addition of ethylene and acrylonitrile in the presence of palladium metal salts.

A catalytic process for the preparation of 1:1 molar adducts of α-olefinic compounds in the presence of a Group VIII noble metal salt is disclosed by Alderson in U.S. Pat. 3,013,066. Specific α-olefinic reactants disclosed include ethylene and acrylonitrile, but no example illustrates their interaction and salts of ruthenium and rhodium are stated to be preferred catalysts. Palladium salts are disclosed to require temperatures of 130–225° C. to achieve results which are obtained with ruthenium and rhodium salts at temperatures below 100° C.

An object of this invention is to provide an improved method for the 1:1 addition of ethylene and acrylonitrile to form pentenenitriles. Another object is to provide a catalytic process for the production of 1:1 molar adducts wherein the formation of certain isomeric linear pentenenitriles is selectively favored.

These objects are accomplished by reacting ethylene with acrylonitrile in the presence of a palladium halide catalyst under reaction conditions which favor the selective formation of certain pentenenitriles and which minimize dimerization of ethylene to form by-product butenes.

The present invention involves the process of 1:1 addition of ethylene and acrylonitrile, in a molar ratio of 1:10 to 1:1.25 and in the presence of a palladium halide catalyst at 50–275° C. and 1–100 atm. pressure, with the catalyst in a mole ratio to total olefinic reactants of 0.0001–0.10. The preferred catalyst is palladium chloride, PdCl₂.

Ethylene, acrylonitrile, and a catalytic amount of the palladium metal salt are allowed to interact in a closed vessel. After a suitable reaction period, there is formed a major amount of a mixture of unbranched linear cis and trans-3-pentenenitriles, cis and trans-2-pentenenitriles and 4-pentenenitrile. There is also formed a minor amount of branched chain cis and trans-2-methyl-2-butenenitrile and 2-methyl-3-butenenitrile.

The reaction may be illustrated by the following equation:

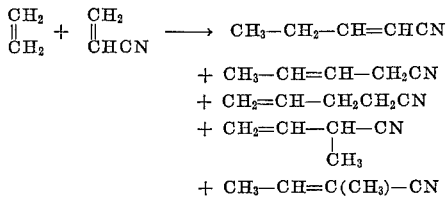

+ CH₃—CH=CH—CH₂CN
+ CH₂=CH—CH₂CH₂CN
+ CH₂=CH—CH—CN
              |
              CH₃
+ CH₃—CH=C(CH₃)—CN

The halide salts of palladium metal, e.g., palladium dichloride, palladium dibromide, etc. and their complexes with such compounds as cyclooctadiene, benzonitrile, dimethylformamide, trialkylphosphine, triarylphosphine and the like are operable palladium salts. Double salts of palladium halides and tetraalkylammonium halides, e.g., bis-(tetraethylammonium) - tetrachloropalladate, are also operable. Because palladium dichloride is readily available, it constitutes a preferred form of catalyst.

The process of this invention is carried out broadly at 50°–275° C. The temperature selected in any one instance depends on the proportion of selected pentenenitrile isomers desired in the product, the form of palladium salt, and the reaction time. Thus, with palladium dichloride at 100° C. relatively more conjugated cis and trans-2-pentenenitrile than unconjugated 3- and 4-pentenenitrile are formed after 4 hours. However, at 200° C. for 1 hour, larger relative amounts of cis and trans-3-pentenenitrile and 4-pentenenitrile are formed. Higher temperatures for relatively short reaction times have a beneficial effect on rate of formation and yield of the 3- and 4-pentenenitriles. Longer reaction times may cause the isomerization of 3- and 4-pentenenitrile to 2-pentenenitrile. The 3- and 4-isomers are desired and preferred because they are intermediates in a route to adiponitrile.

The process is generally carried out at pressures which are less than about 100 atmospheres. Because of its low boiling point, ethylene is the vastly predominant source of pressure in the reaction system. It has been found that excessively high ethylene pressures favor ethylene dimerization to butenes over 1:1 addition of ethylene and acrylonitrile (so-called mixed dimerization) to pentenenitriles. It has been further found that mixed dimerization that does occur at excessively high ethylene pressures results in formation of relatively more 2-pentenenitrile than the 3- and 4-isomers. The best balance from the standpoint of yield of preferred product, reaction rate, and ease of operation, is realized at pressures of 1–100 atmospheres. Pressures of 5–80 atmospheres are preferred.

The acrylonitrile:ethylene molar ratio should be relatively large in order to minimize ethylene dimerization to butenes. The effect of large acrylonitrile:ethylene ratios thus correlates with the effect of pressure; and the correlation extends to the distribution of isomeric pentenenitriles formed in that large acrylonitrile:ethylene ratios favor the formation of 3- and 4-pentenenitriles while small ratios favor formation of 2-pentenenitrile. An operable ratio is in the range 1.25:1 to 100:1. The preferred ratio is in the range of 1.25:1 to 10:1.

The effects of pressure and molar ratio of reactants on the proportions of the isomeric pentenenitriles formed by mixed dimerization are not disclosed in U.S. 3,013,066, and are not considered to be obvious or expected.

In practice a pressure reactor is charged with acrylonitrile, the palladium metal salt, and, if desired, a solvent, e.g., dimethylformamide, acetonitrile, methylene chloride, chloroform, benzene, etc. The reactor is then cooled, evacuated and the ethylene is added. The charged reactor is then maintained between 50–275° C. with agitation. After pressure drop has essentially ceased, the reaction mixture is allowed to cool, the reactor is opened, and the contents discharged. The desired product is isolated by distillation or other means known to those skilled in the art.

The reaction may also be carried out in a continuous manner, as, for example, by continuously introducing catalyst, acrylonitrile, and ethylene into a reactor and continuously withdrawing reaction mass. The unreacted acrylonitrile and ethylene may be reintroduced into the reactor with fresh or reconstituted catalyst. A series of reactors may also be used. Those may be arranged, if desired, in cascade fashion. The reactions may also be carried out in a continuous flow through an elongated reactor, such as, for example, a pipe.

EXAMPLES

Examples 1–28, data for which are given in the Table were carried out in the following manner. The reaction vessel was a 60 ml. heavy-wall glass Carius tube. The metal halide catalyst was placed in the tube and the tube connected with rubber tubing to a glass 2-way stopcock, which was connected to a vaccum pump, and to a 2.25 liter stainless steel cylinder. The cylinder in turn was connected to a source of reagent-grade ethylene. The Carius tube was evacuated to less than 0.01 mm. pressure, and then cooled in liquid nitrogen. The 2.25 liter stainless steel cylinder was filled with the desired amount of ethylene as indicated by a pressure gauge. The desired amount of acrylonitrile (and solvent) was delivered into the tube with a hypodermic syringe through the rubber tubing connecting the tube to the stopcock. The stopcock was then opened allowing the ethylene to condense into the tube. The tube was sealed and heated at the indicated temperature for the time noted. The reactor was then cooled in liquid nitrogen, the seal was broken, and any unreacted ethylene allowed to evaporate. The residual product, containing pentenenitriles and unreacted acrylonitrile, was removed and analyzed for pentenenitriles by gas chromatography.

Examples 1, 2 and 3 show that ruthenium and rhodium salts, disclosed in U.S. 3,013,066 as being excellent catalysts for the dimerization of α-olefins and much superior to palladium salts for that purpose, are surprisingly poor catalysts for the 1:1 addition of ethylene and acrylonitrile. In fact, the ruthenium salt shows no activity for formation of pentenenitriles; and the rhodium salt shows no activity for formation of 3- and 4-pentenenitriles while giving only small percentages of any pentenenitrile. The greatly superior activity of palladium salts as catalysts for the mixed dimerization of ethylene and acrylonitrile is therefore quite surprising, and the formation of a high proportion of 3- and 4-pentenenitriles is likewise surprising and unexpected.

The pentenenitriles obtained by the process of this invention are useful as intermediates in the production of hexanedinitriles by reaction with hydrogen cyanide according to procedures disclosed in a commonly assigned patent application S.N. 509,432 filed Nov. 23, 1965 in the names of Drinkard and Lindsey, now U.S. Pat. 3,496,215 issued Feb. 17, 1970. The 3- and 4-pentenenitriles are especially useful in this way because the product of their hydrocyanation is adiponitrile, a well-known polyamide intermediate.

The embodiments of the invention in which an exclusive property or privilege is claimed are defined as follows:

1. A process for producing a mixture of pentenenitriles which comprises reacting ethylene and acrylonitrile in the presence of an excess of acrylonitrile at a pressure ranging from 1 to 100 atmospheres, at a temperature within the range of 50°–275° C., and in the presence of a catalyst consisting essentially of a halide salt of palladium metal the molar ratio of salt to total olefinic reactants being from 0.0001 to 0.10 and the molar ratio of acrylonitrile to ethylene ranging from 1.25:1 to 100:1.

2. A process according to claim 1 in which the reactants are present in the proportion of 1.25 to 10 moles of acrylonitrile for each mole of ethylene.

3. A process for producing a mixture of 3-pentenenitrile and 4-pentenenitrile which comprises reacting 1 mole of ethylene with 1 mole of acrylonitrile in the presence of an excess of 1.25 to 10 moles of acrylonitrile per mole of ethylene, at a pressure of 1 to 100 atmospheres, at a temperature of 50° to 275° C., and in the presence of a catalyst consisting essentially of a halide salt of palladium metal, the molar ratio of salt to total olefinic reactants being from 0.0001 to 0.10.

4. A process according to claim 3 in which the catalyst is palladium chloride.

TABLE.—1:1 ADDITION OF ETHYLENE AND ACRYLONITRILE

| Ex. | Acrylonitrile, ml. (moles) | Ethylene moles | Calcd. ethylene pressure (atm.) | Molar ratio acrylonitrile: ethylene | Catalyst (g.) | Solvent (ml.) | Time (hrs.) | Temp. (° C.) | PN content in reaction mixture — Total unbranched linear PN, wt. percent | PN content in reaction mixture — 3- and 4-PN in total PN, wt. percent |
|---|---|---|---|---|---|---|---|---|---|---|
| 1 | 5 (0.076) | 0.12 | 70 | 0.63 | RuCl₃ (0.1) | | 1 | 150 | | |
| 2 | 5 (0.076) | 0.12 | 70 | 0.63 | RhCl₃ (0.05) | | 1 | 150 | 0.14 | 0.0 |
| 3 | 5 (0.076) | 0.12 | 70 | 0.63 | RhCl₃ (0.05) | Methanol (2) | 1 | 150 | 1.56 | 0.0 |
| 4 | 5 (0.076) | 0.12 | 61 | 0.63 | PdCl₂ (0.01) | | 2 | 100 | 3.37 | 11.4 |
| 5 | 5 (0.076) | 0.12 | 61 | 0.63 | PdCl₂ (0.1) | | 4 | 100 | 9.69 | 14.8 |
| 6 | 5 (0.076) | 0.12 | 70 | 0.63 | PdCl₂ (0.01) | | 1 | 150 | 19.90 | 31.4 |
| 7 | 5 (0.076) | 0.0535 | 31 | 1.4 | PdCl₂ (0.01) | Methanol (1) | 1 | 150 | 14.57 | 38.8 |
| 8 | 10 (0.152) | 0.0535 | 31 | 2.8 | PdCl₂ (0.01) | | 1 | 150 | 7.52 | 35.9 |
| 9 | 10 (0.152) | 0.12 | 70 | 1.27 | PdCl₂ (0.1) | | 2 | 150 | 15.31 | 36.0 |
| 10 | 10 (0.152) | 0.034 | 20 | 4.4 | PdCl₂ (0.1) | | 2 | 150 | 11.01 | 46.6 |
| 11 | 5 (0.076) | 0.0535 | 31 | 1.4 | PdCl₂ (0.1) | DMF (2) | 2 | 150 | 6.03 | 54.5 |
| 12 | 5 (0.076) | 0.0535 | 33 | 1.4 | PdCl₂ (0.1) | | 1 | 175 | 31.82 | 32.5 |
| 13 | 5 (0.076) | 0.0535 | 33 | 1.4 | PdCl₂ (0.1) | | 4 | 175 | 31.42 | 34.5 |
| 14 | 5 (0.076) | 0.0535 | 35 | 1.4 | PdCl₂ (0.1) | | 1 | 200 | 31.43 | 42.7 |
| 15 | 10 (0.152) | 0.12 | 70 | 1.27 | PdCl₂ (0.1)·Et₄NCl (0.1) | | 2 | 150 | 10.14 | 60.8 |
| 16 | 10 (0.152) | 0.12 | 70 | 1.27 | PdCl₂ (0.04)·Et₄NCl (0.16) | | 2 | 150 | 2.62 | 41.2 |
| 17 | 10 (0.152) | 0.034 | 21 | 4.4 | PdCl₂ (0.05) | | 1 | 175 | 11.74 | 47.0 |
| 18 | 10 (0.152) | 0.034 | 22 | 4.4 | PdCl₂ (0.05) | | 1 | 200 | 11.93 | 42.0 |
| 19 | 20 (0.304) | 0.034 | 17–21 | 9.0 | PdCl₂ (0.1) | | 1 plus 1 | 100 175 | 6.55 | 46.8 |
| 20 | 10 (0.152) | 0.0535 | 27–33 | 2.8 | PdCl₂ (0.1) | | 1 plus 1 | 100 175 | 11.50 | 36.2 |
| 21 | 10 (0.152) | 0.12 | 61–74 | 1.27 | PdCl₂ (0.1) | | 1 plus 1 | 100 175 | 12.64 | 34.0 |
| 22 | 10 (0.152) | 0.0535 | 31 | 2.8 | PdCl₂·(LiCl)₂ (0.2) | | 2 | 150 | 12.83 | 39.3 |
| 23 | 5 (0.076) | 0.034 | 20 | 2.2 | PdCl₂ (0.1) | | 2 | 150 | 18.44 | 44.5 |
| 24 | 10 (0.152) | 0.0125 | 7 | 12.1 | PdCl₂ (0.1) | | 2 | 150 | 4.83 | 46.4 |
| 25 | 10 (0.152) | 0.034 | 20 | 4.4 | (PdCl₂)₀.₅₅·(Et₄NCl)₀.₆ (0.2) | | 2 | 150 | 4.01 | 64.5 |
| 26 | 10 (0.152) | 0.0062 | 4 | 24.5 | PdCl₂ (0.1) | | 2 | 150 | 1.69 | 54.6 |
| 27 | 10 (0.152) | 0.0535 | 31 | 2.8 | [PdCl₂·(LiCl)₂]₁.₀·(Et₃NHCl)₀.₇ (0.3) | | 2 | 150 | 11.66 | 52.5 |
| 28 | 10 (0.152) | 0.0535 | 31 | 2.8 | (PdCl₂)₀.₅₅·(Et₃NHCl)₀.₇ (0.2) | | 2 | 150 | 6.29 | 53.4 |

Notes.—PN—Pentenenitriles; 3-PN—3-Pentenenitrile; 4-PN—4-Pentenenitrile; DMF—Dimethylformamide; (Et₄N)—Tetraethylammonium; (Et₃NHCl)—Triethylammonium hydrochloride.

References Cited

UNITED STATES PATENTS 3,013,066  12/1961  Alderson _____ 260—465.8X

JOSEPH P. BRUST, Primary Examiner

U.S. Cl. X.R.